United States Patent [19]

Chouinard et al.

[11] Patent Number: 4,903,373
[45] Date of Patent: Feb. 27, 1990

[54] SCALLOP EVISCERATING MACHINE

[75] Inventors: Joseph R. C. Chouinard, Liverpool; Richard R. Cowmeadow, Halifax, both of Canada

[73] Assignee: Canadian Patents and Development Limited/Societe Canadienne Des Brevets Et D-Exploitation Limitee, Ottowa, Canada

[21] Appl. No.: 208,245

[22] Filed: Jun. 17, 1988

[30] Foreign Application Priority Data

Jun. 18, 1987 [CA] Canada ................................. 540001

[51] Int. Cl.⁴ .............................................. A22C 25/16
[52] U.S. Cl. ........................................ 17/53; 17/46; 17/48
[58] Field of Search ................. 17/53, 71, 76, 73, 46, 17/74, 62, 48

[56] References Cited

U.S. PATENT DOCUMENTS

| | | | |
|---|---|---|---|
| 2,712,152 | 7/1955 | Samanie | 17/2 |
| 2,719,555 | 10/1955 | Wood | 146/55 |
| 2,832,092 | 4/1958 | Lapeyre et al. | 17/2 |
| 2,832,989 | 5/1958 | Harris | 17/45 |
| 3,129,456 | 4/1964 | Renfroe | 17/45 |
| 3,156,948 | 11/1964 | Polito | 17/45 |
| 3,177,522 | 4/1965 | Renfroe | 17/53 |
| 3,203,034 | 8/1965 | Matzer et al. | 17/2 |
| 3,230,578 | 1/1966 | Marvin et al. | 17/9 |
| 3,257,684 | 6/1966 | Wenstrom et al. | 17/45 |
| 3,320,631 | 5/1967 | Brown | 17/2 |
| 3,417,423 | 12/1968 | Meyer | 17/2 |
| 3,465,382 | 9/1969 | Meyer | 17/53 |
| 3,528,124 | 9/1970 | Wenstrom et al. | 17/48 |
| 3,562,855 | 2/1971 | Willis | 17/48 |
| 3,621,515 | 11/1971 | Bunnell | 17/53 |
| 3,662,431 | 5/1972 | Willis | 17/48 |
| 3,662,432 | 5/1972 | Wenstrom | 17/53 |
| 3,703,022 | 11/1972 | Bunnell | 17/53 |
| 3,829,933 | 8/1974 | Lambert | 17/53 |
| 3,988,805 | 11/1976 | Martin | 17/48 |
| 4,141,114 | 2/1979 | Carlson | 17/74 |
| 4,255,834 | 3/1981 | Lambert | 17/48 |
| 4,361,933 | 12/1982 | Rodman et al. | 17/48 |

FOREIGN PATENT DOCUMENTS

| | | | |
|---|---|---|---|
| 1164166 | 3/1984 | Canada | 17/4 |
| 3818747 | 6/1965 | Japan | 17/74 |
| 1418985 | 12/1975 | United Kingdom | |

OTHER PUBLICATIONS

Franken B.V., 2-p. brochure entitled, "Debyssing Machines".

Primary Examiner—Willis Little
Attorney, Agent, or Firm—Cooper & Dunham

[57] ABSTRACT

Apparatus for eviscerating fresh scallops immediately after they have been shucked from the shell, which apparatus cleanly strips membrane, roe and entrails from the edible adductor muscle without causing damage to the latter. No ageing, chemical or heat pretreatment is required. The apparatus includes a feed hopper which meters product flow single file onto one end of a set of two horizontal, counterrotating pinch rollers. A horizontal open bottom trough directs and contains the scallops on the top surfaces of the rollers. The rollers are critically sized and knurl textured and supported in rolling contact so as to nip and downwardly strip off soft entrails and membrane but support the firm cylindrical meat (muscle tissue). Water sprays and high speed cylindrical rotary brushes clean the rollers from below. The rollers have left and right hand helical grooves which advance the product along the rollers from the hopper to a discharge end while being processed. The knurl patterns of the rollers preferably have a plurality of longitudinal V-shaped grooves cut into them for about the first 6 to 10 inches of the rollers to damage the roe and liver which are then more readily caught in the nip between the rollers.

9 Claims, 4 Drawing Sheets

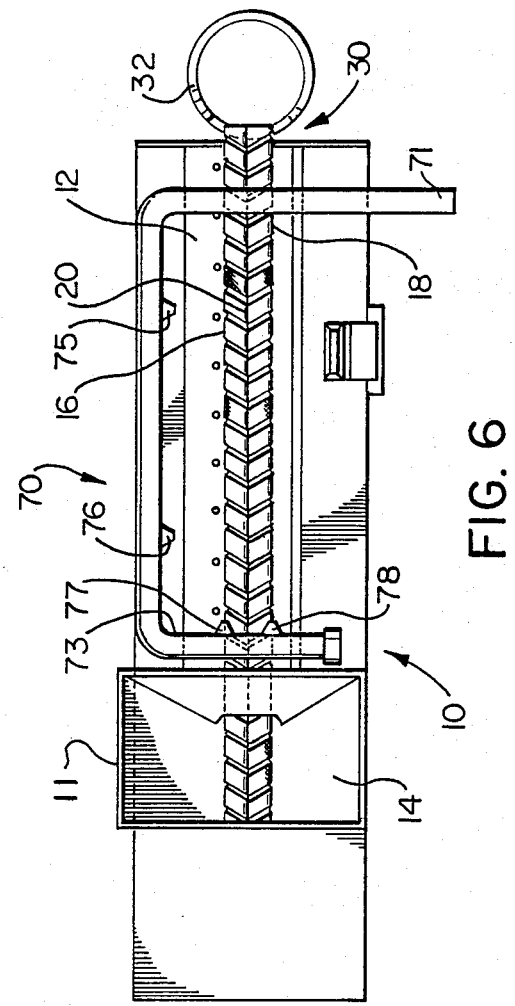
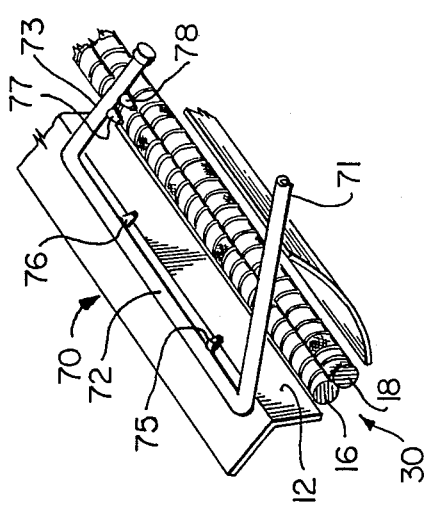
FIG. 6
FIG. 5

SCALLOP EVISCERATING MACHINE

BACKGROUND OF THE INVENTION

This invention relates to apparatus for eviscerating scallops after they have been shucked.

After scallops have been harvested they have to be shucked (removed from their shells) and then eviscerated, which involves separating the membrane, entrails and roe (if any) from the adductor muscle which is the meat portion most often consumed by humans. Various arrangements have been devised for shucking and/or eviscerating scallops but the present invention is concerned with the evisceration operation. The scallops to be eviscerated can be shucked by known arrangements or by hand although it is preferred that they not be subjected to heat treatment which could cause partial cooking and accelerated bacteria growth which may reduce shelf life and product appeal. An apparatus for shucking scallops is disclosed in U.S. Pat. No. 4,361,933 of William K. Rodman, issued Dec. 7, 1982. Rodman uses high volume, low pressure, water jets to strip frill and internals from the meat. However, meat damage (splitting and erosion) occurs at pressure and flow levels which could cause 80-90% entrail removal, whereas a jet adjustment which does no damage removes no frills and organs. Such damage is commercially unacceptable.

Another apparatus for processing scallops is disclosed in U.S. Pat. No. 3,562,855 of Elmer Dryden Willis, issued Feb. 16, 1971. That apparatus, which uses a thermal and/or chemical bath for shell removal, eviscerates the scallops by passing them over an inclined bed of pinch rolls in a direction perpendicular to the roller axes. The counter rotating roller pairs oscillate, clockwise, and then counterclockwise, thereby stepping the product down the incline. The rolls are covered with a rubberized abrasive grit tape. Water sprays are used to regulate the residence time of the scallops on the bed of rollers and to clean the rollers. In practice, many of the scallops have to be recycled through the eviscerator. This is due to gaps between roller centers due to fixed bearing design and abrasive wear as well as clogging of the "grit" by thin membrane waste. An eviscerator of the type shown in this patent may have quite a large number of rolls, e.g. 80, requiring numerous sprockets, a complex chain drive and several horsepower to drive. The oscillator drive is also fairly complicated and costly. The overall device is quite large in size e.g. 42"×96" in comparison to its capacity and effectiveness.

Franken B. V. in Holland makes a roller bed mussel debysser which is also capable of eviscerating scallops although sometimes the liver and the roe sac do not pull through. Also, thin tough membranes from the scallops wrap around the rolls, reducing their roughness or "bite" which greatly reduces their eviscerating ability. This device is essentially identical in use and construction to the Willis device except that it uses continuous roll rotation without oscillation.

SUMMARY OF THE INVENTION

The present invention provides apparatus for eviscerating scallops which has only two continuously driven rolls and thus is relatively small in size as compared to the prior art roller-bed devices. The rolls are continuously cleaned to preserve their effectiveness. The apparatus as described herein can process in excess of 100 scallops per minute with only ½ horsepower required. This is adequate to post process the output of 5 manual shuckers or 1 to 2 machine shuckers such as disclosed in the above mentioned U.S. Pat. No. 4,361,933. The apparatus is effective at eviscerating a wide size range of scallops, does not damage the scallop meat, and does not require any chemical bath, heat treatment or "ageing" of the scallops prior to processing.

Thus, in accordance with a broad aspect of the invention, there is provided apparatus for eviscerating scallops after they have been shucked comprising an elongated generally horizontally extending trough portion for receiving said scallops, said trough portion having a bottom slot in which are disposed first and second elongated rolls in side-by-side relationship defining a nip in a vertical plane between said rolls, said first roll having a knurled surface and being provided with a left-hand-thread helical groove, said second roll having a knurled surface and being provided with a right-hand-thread helical groove, said apparatus having means for rotating said rollers in opposite directions so that their surfaces enter said nip in a vertically downward direction whereby viscera tend to be pulled from muscle portions of the scallops and through said nip while said grooves move the scallops longitudinally of the rolls towards a discharge region, said apparatus having rotary cleaning brushes engaging the rolls below said slot and said brushes engaging flicker bars to clean the brushes.

BRIEF DESCRIPTION OF THE DRAWINGS

The invention will now be further described in conjunction with the accompanying drawings, in which:

FIG. 5 is a simplified diagram of a portion of the apparatus illustrating an alternative arrangement for moving scallops along the rolls.

FIG. 6 is a top view of apparatus according to the invention similar to the embodiment of FIG. 1 but using the arrangement of FIG. 5 for moving scallops along the rolls.

DESCRIPTION OF THE PREFERRED EMBODIMENTS

Figure 1:
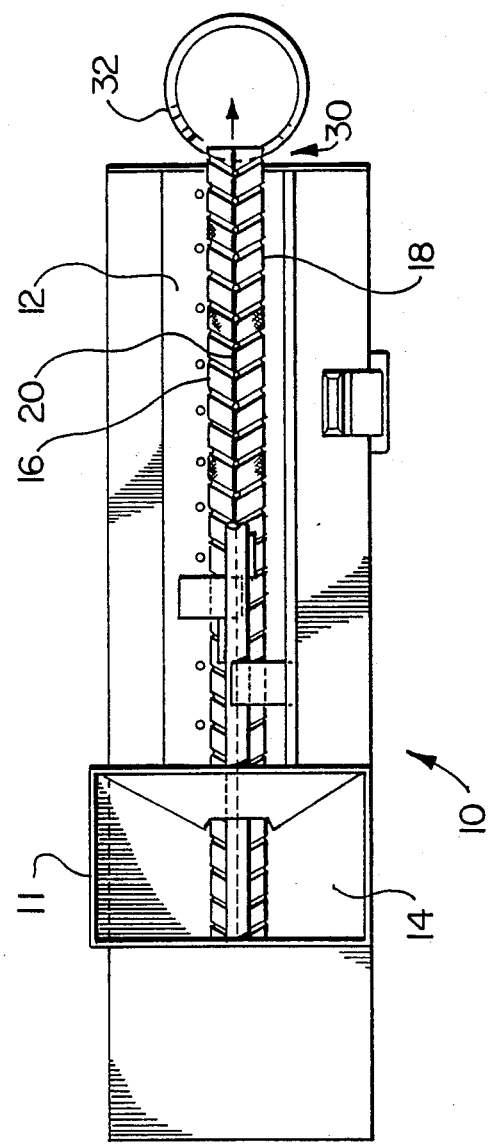
FIG. 1 is a top view of apparatus for eviscerating scallops according to the present invention.
Figure 2:
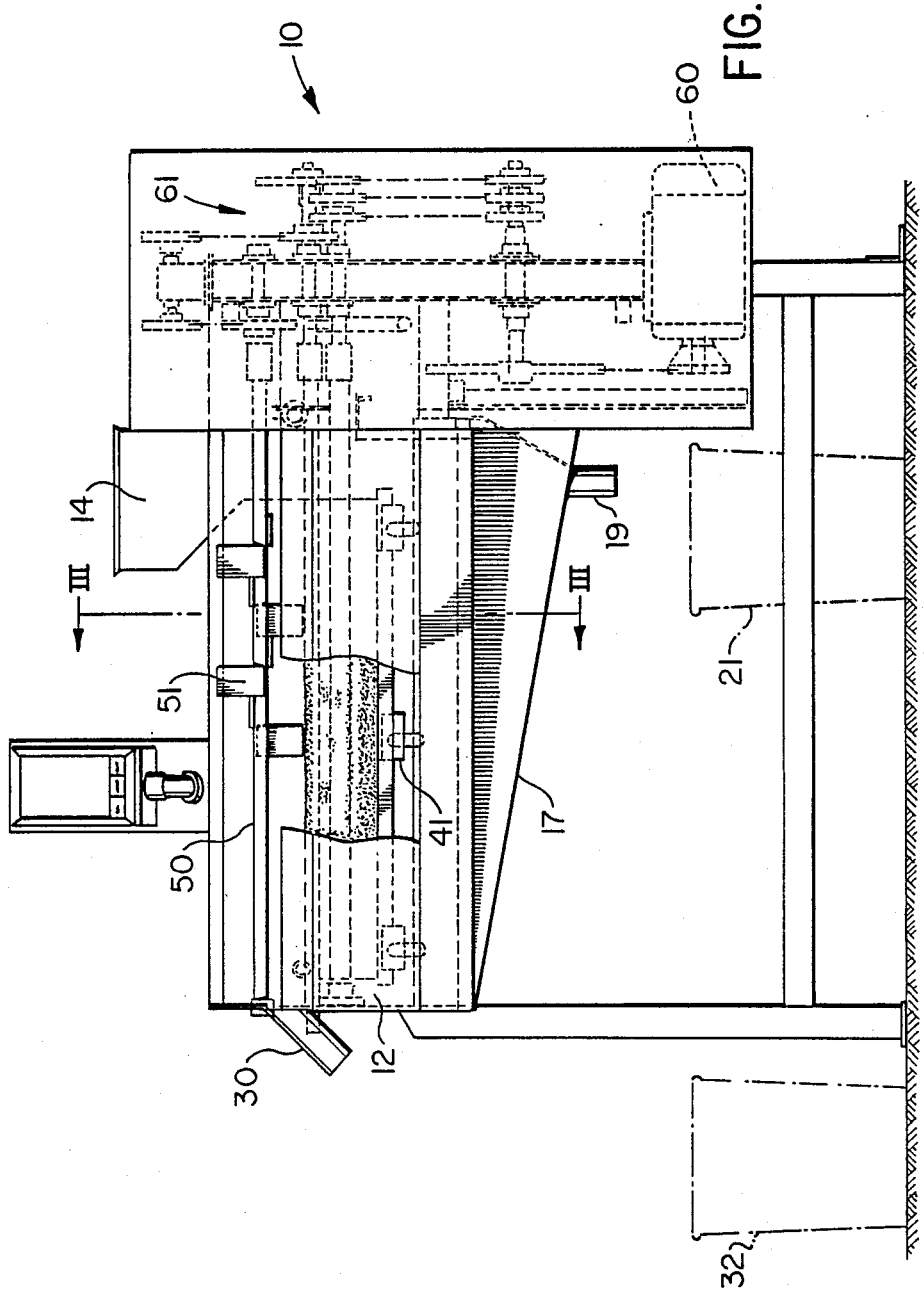
FIG. 2 is an elevational view, partly cut away and partly in phantom, of the apparatus according to the invention.
Figure 3:
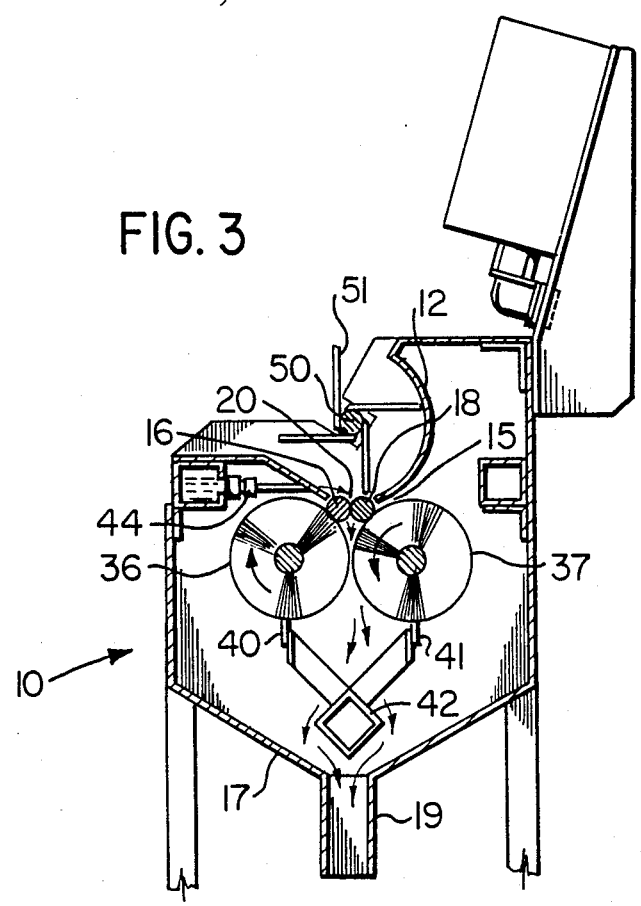
FIG. 3 is a cross-sectional view of the apparatus, along the line III—III of FIG. 2.
Figure 4:
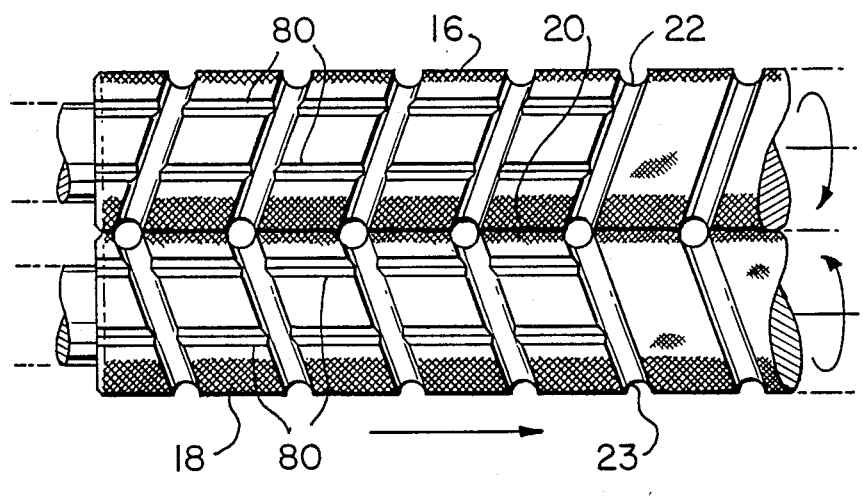
FIG. 4 is an enlarged view of portions of the rolls used in the apparatus according to the invention.

Referring to FIGS. 1 to 3, the apparatus for eviscerating scallops is generally indicated at 10. The apparatus comprises an elongated generally horizontally extending trough portion 12 for receiving scallops (previously shucked) fed in via a hopper 14 by an operator standing on side 11 thereof. At the bottom of the trough portion 12 there is a slot 15 (FIG. 3) in which are mounted first and second elongated rolls 16 and 18 in side-by-side relationship and defining a nip 20 in a vertical plane between the rolls. As best seen in FIG. 4, the first roll 16 has a knurled surface and is provided with a left-hand-thread helical groove 22. The second roll 18 also has a knurled surface but it is provided with a right-hand-thread helical groove 23. Means are provided for rotating the rolls 16 and 18 in opposite directions, as indicated by the arrows in FIGS. 3 and 4, so that their surfaces enter the nip 20 in a vertically downward direction whereby viscera tend to be pulled from muscle portions of the scallops and through the nip. The grooves 22 and 23 move the scallops (not shown) longitudinally of the rolls (to the right in FIGS. 1 and 4, to the left in FIG. 2) towards a discharge region 30 from which they fall into a container 32. The viscera pass through the nip 20, drop into the sloped bottom portion 17 and pass through a discharge chute 19 to a container 21 for disposal.

Referring to FIG. 3, rotatable cleaning brushes 36 and 37 engage the knurled surfaces of rolls 16 and 18 from below the slot 20. The brushes keep the knurled surfaces of the rolls from being clogged by the viscera and wrapping of thin membranes which would impede their subsequent gripping action.

Flicker bars 40 and 41 mounted on a support 42 serve to "flick" the bristles of rotating brushes 36 and 37 which are kept clean by centrifugal force of rotation aided by the action of the flicker bars. Cleaning of the rolls and passage of viscera through the nip 20 is preferably aided by spraying water on the rolls from nozzles, one of which is shown at 44 in FIG. 3.

To aid in ensuring that the viscera are caught in the nip 20, and are not supported by the meat for the full resident time, there may be provided a slowly rotating shaft 50 on which are mounted a plurality of flexible "flipper" vanes such as 51 (see also FIG. 2). These vanes turn the scallops as they move along the rolls, sweeping them up the curved trough surface 12 until they slide down the vane and again onto the rolls in an inverted or random position. The trough surface 12 has bands of rubberized abrasive grit tape fixed to it. Also found to be effective is a single sharpened rigid vane running the full processing length of the pinch rolls. Multiple water jets directed across the pinch rolls with adequate pressure and volume flow to roll or flip the product is a third effective (and presently preferred) method, as illustrated in FIGS. 5 and 6. As seen in FIGS. 5 and 6, piping 70 is mounted in any suitable manner to extend from an inlet 71 to a straight section 72 extending along one side of trough 12 and then to an end section 73 extending across the trough 12 near the end opposite the discharge region 30. The piping 30 is provided with four fan jets 75–78 two of which (75,76) discharge across the rolls 16, 18 and the other two of which (77 and 78) discharge water along the rolls toward the discharge region 30. All four jets provide horizontally extending jets of water and assist in flipping the meats and moving them along the rolls. Four jets are preferred but fewer or more could be used.

The rolls 16 and 18, shaft 50 with flipper vanes 51 and brushes 36 and 37 may be rotated by a motor 60 and any suitable transmission such as a system of pulleys and flexible belts as indicated generally at 61.

The rolls 16 and 18 are preferably 0.875 inch to 1.00 inch diameter with a full depth 12 pitch 30 degree diamond knurl. The pinch roller knurling pattern extends the full trough length starting outside the feed hopper 14 up to but not including the ends supported near the discharge region 30. Such rolls are effective but do not damage the scallop meats.

The rolls are preferably flooded with water to dissolve and flush away the viscous slurry produced by crushing the viscera. Meats leaving the rolls should be sprayed with clean water to wash off crusted and other material. Dry rollers of the correct size won't crush meats but viscous slurry can prevent entry of viscera into the nip.

The helical grooves in the rolls may be 0.050 inch deep (root to crest) with a 0.050 inch radius. The firm meats engage the helical grooves thereby positively transporting the scallops axially along the horizontal pinch rolls while they are processed. The grooves should not be too big or the meats may be pulled through the nip. The thread pitch is preferably 2 to 4 per inch and extends from within the feed hopper to the full extremity of the roller discharge end. The pinch roller shafts are provided with synchronizing spur gears at the drive end which maintains face to face alignment of opposing knurl surfaces and helical grooves. Correct alignment is shown in FIG. 4. Referring to FIG. 4, the knurl pattern preferably has a plurality of parallel longitudinal V-shaped grooves 80 cut into the knurl for about the first 6 to 10 inches of the rollers. These V-shaped grooves may be, for example, 1/16 inch deep with sides subtending an angle of about 30°. The V-shaped grooves 80 damage the roe and liver sufficiently to ensure they are caught in the nip between the rollers and hence removed from the scallop meats.

By way of example and not limitation the rolls may be 32 inches long.

What we claim as our invention is:

1. Apparatus for eviscerating scallops after they have been shucked comprising an elongated generally horizontally extending trough portion for receiving said scallops, said trough portion having a bottom slot, and comprising first and second elongated rolls disposed in side-by-side relationship in said bottom slot, said rolls defining a nip in a vertical plane between said rolls, said first roll having a knurled surface and being provided with a left-hand-thread helical groove, said second roll having a knurled surface and being provided with a right-hand-thread helical groove, said apparatus having means for rotating said rolls in opposite directions so that their surfaces enter said nip in a vertically downward direction whereby viscera tend to be pulled from muscle portions of the scallops and through said nip while said grooves move the scallops longitudinally along the rolls toward a discharge region, said apparatus having rotary cleaning brushes engaging said rolls below said slot and said brushes engaging flicker bars to clean the brushes.

2. Apparatus as claimed in claim 1 and further comprising means for turning said scallops as they move longitudinally of the rolls.

3. Apparatus as claimed in claim 2 including a hopper for receiving a plurality of scallops and delivering them essentially single file to said channel portion at a region remote from said discharge region.

4. Apparatus as claimed in claim 3 wherein the knurled surfaces of end regions of said rolls adjacent said hopper are provided with a plurality of V-shaped grooves.

5. Apparatus as claimed in claim 4 wherein there are 8 to 10 V-shaped grooves each having a length of 6 to 10 inches and a depth of about 1/16 inch.

6. Apparatus as claimed in claim 5 including means for spraying water into said trough.

7. Apparatus as claimed in claim 6 wherein said rolls are provided with 12 pitch by 30 degree diamond knurl and the diameter of said rolls is in the range of 0.875 inch to 1.000 inch.

8. Apparatus as claimed in claim 1 wherein each said helical groove is about 0.050 inch deep with a radius of about 0.050 inch and has a pitch in the range of 2 to 4 grooves per inch of roller length.

9. Apparatus as claimed in claim 2 wherein said means for turning said scallops comprises fan jets for directing water across and along said rolls.

\* \* \* \* \*